(12) United States Patent
Ceres (10) Patent No.: US 12,012,661 B2
(45) Date of Patent: Jun. 18, 2024

(54) ELECTROLYTIC GENERATORS

(71) Applicant: Aquamox Inc., Chicago, IL (US)

(72) Inventor: Donato M. Ceres, Chicago, IL (US)

( * ) Notice: Subject to any disclaimer, the term of this patent is extended or adjusted under 35 U.S.C. 154(b) by 92 days.

(21) Appl. No.: 16/914,299

(22) Filed: Jun. 27, 2020

(65) Prior Publication Data

US 2021/0404069 A1 Dec. 30, 2021

(51) Int. Cl.
*C25B 1/13* (2006.01)
*C02F 1/467* (2023.01)

(52) U.S. Cl.
CPC .............. *C25B 1/13* (2013.01); *C02F 1/4672* (2013.01); *C02F 2201/4611* (2013.01); *C02F 2201/46115* (2013.01)

(58) Field of Classification Search
CPC .......... C02F 1/4672; C02F 2201/46115; C02F 2201/4611; C25B 1/13; C25B 9/77
See application file for complete search history.

(56) References Cited

U.S. PATENT DOCUMENTS

| | | | |
|---|---|---|---|
| 5,148,772 A | 9/1992 | Kirschbaum | |
| 5,460,705 A | 10/1995 | Murphy et al. | |
| 5,788,826 A * | 8/1998 | Nyberg | C02F 1/4693 204/632 |
| 5,900,127 A | 5/1999 | Iida et al. | |
| 5,972,196 A * | 10/1999 | Murphy | B01D 53/326 205/466 |
| 6,306,270 B1 | 10/2001 | Hanni et al. | |
| 6,309,532 B1 * | 10/2001 | Tran | G01N 30/96 204/554 |
| 7,704,353 B2 | 4/2010 | Stadelmann et al. | |
| 7,887,679 B2 | 2/2011 | Kitaori et al. | |
| 7,951,274 B2 | 5/2011 | Yoshida et al. | |
| 7,964,068 B2 | 6/2011 | Kitaori et al. | |
| 8,277,623 B2 | 1/2012 | Kato et al. | |
| 8,273,254 B2 * | 9/2012 | McCague | C02F 1/4674 210/167.13 |
| 8,323,461 B2 | 12/2012 | Scarsbrook | |
| 8,361,289 B2 | 1/2013 | Whitehead et al. | |
| 8,431,006 B2 | 4/2013 | Arihara et al. | |
| 8,440,080 B2 | 5/2013 | Salama et al. | |
| 8,734,626 B2 | 5/2014 | Arihara et al. | |
| 8,815,064 B2 | 8/2014 | Kata et al. | |

(Continued)

FOREIGN PATENT DOCUMENTS

| | | |
|---|---|---|
| DE | 10025167 A1 | 8/2004 |
| EP | 0822271 A2 | 7/1997 |

*Primary Examiner* — Ciel P Contreras
(74) *Attorney, Agent, or Firm* — NovisIP, LLC; Paul E Schaafsma (57) ABSTRACT

In accordance with the principals of the present invention, an electrolytic generator and method of electrolytic generation are provided. An electrolytic stack includes of a first electrode, a second electrode, and a polymer-electrolyte membrane placed between the first and second electrodes. A first fluid passage provides fluid passage over the first electrode while a second fluid passage provides fluid passage over the second electrode. A third fluid passage provides fluid connection between the first fluid passage and the second fluid passage such that the fluid flows from the first fluid passage to the second fluid passage via the third fluid passage. An electronic current is provided between the first electrode and the second electrode when a voltage bias is applied to the electrodes.

21 Claims, 8 Drawing Sheets

(56) References Cited

U.S. PATENT DOCUMENTS

| | | |
|---|---|---|
| 8,980,079 B2 | 4/2015 | Yose, III et al. |
| 9,540,259 B2 | 1/2017 | Lutz et al. |
| 9,920,441 B2 | 3/2018 | Sekiguchi et al. |
| 10,227,242 B2 | 3/2019 | Hamguchi et al. |
| 10,239,772 B2 | 3/2019 | Ceres et al. |
| 2009/0211918 A1 | 8/2009 | Hardee |
| 2013/0032491 A1 | 2/2013 | Nitta et al. |
| 2013/0206654 A1 | 8/2013 | Lutz et al. |
| 2014/0054166 A1 | 2/2014 | Brandon et al. |
| 2014/0076724 A1 | 3/2014 | Cheng et al. |
| 2014/0158525 A1 | 6/2014 | Greene |
| 2015/0068914 A1* | 3/2015 | Brondum ............ G01N 33/182 |
| | | 204/279 |
| 2015/0376804 A1 | 12/2015 | Gorokhovsky et al. |
| 2016/0369318 A1 | 12/2016 | Carlisle et al. |
| 2017/0137953 A1 | 5/2017 | Jonte et al. |
| 2017/0256802 A1* | 9/2017 | Mosby .................. C25B 13/04 |
| 2018/0112317 A1 | 4/2018 | Zeng et al. |
| 2018/0171491 A1 | 6/2018 | Jante et al. |
| 2020/0024759 A1 | 1/2020 | Booth et al. |
| 2021/0024383 A1 | 1/2021 | Lust et al. |

\* cited by examiner

ELECTROLYTIC GENERATORS

FIELD OF THE INVENTION

The present invention relates to electrolytic generators.

BACKGROUND OF THE INVENTION AND STATE OF THE ART

Electrolytic cells are used to produce various chemistries (e.g., compounds and elements). An application of electrolytic cells is the production of ozone. Ozone is a potent oxidizer comprised of three oxygen atoms ($O_3$). Because of its oxidizing power, ozone is often used to kill pathogens such as bacteria, fungi, spores, viruses, and the like. The electrochemical potential of ozone is significantly higher than that of other commonly used oxidizers, and therefore ozone also reacts faster when in contact with oxidizable matter, such as pathogens and organics. Ozone can be dissolved in water to disinfect the water for drinking; however, when the water is already clean of impurities, ozonated water can be used for practical and non-toxic disinfection of surfaces, meat, fruit, vegetables, and the like. Another advantage is with the lapse of time ozone turns to harmless oxygen through autolysis; therefore, ozone is easier and safer to handling than chemicals designed to achieve the same results, without secondary contamination by chemical residues or reaction by-products.

Electrolytic-ozone generators were introduced over twenty years ago, and have evolved from the development of water electrolyzers for hydrogen production and fuel cell applications. These water electrolyzers comprise two electrodes comprising an anode and a cathode. The electrodes are comprised of catalytic materials suitable for water electrolysis when an electrical current is applied to the electrodes, specifically oxygen evolution (at the anode) and hydrogen evolution (at the cathode).

The anode, comprising a suitable catalytic material, is placed in contact with one side of a polymer-electrolyte membrane, typically a proton-exchange membrane. The cathode, comprising a suitable catalyst material, is placed in contact with the other side of the polymer-electrolyte membrane, opposite to the anode. The anode and cathode may contain a multitude of openings to allow a fluid to reach the electrode side in contact with the membrane where the electrolytic reaction occurs.

During electrolysis, protons generated at the anode migrate through the proton-exchange membrane until reaching the cathode, where the protons further react with the catalytic material of the cathode to form hydrogen gas ($H_2$). Because there is no gap between the electrodes and membrane, this type of electrolytic cell is often referred to as a zero-gap electrolytic cell.

Anode catalytic materials with high overpotential for water electrolysis promote the formation of oxidants with high oxidation potential, for instance, ozone, hydrogen peroxide, hydroxyl radicals, oxygen radicals, and the like. Anode catalytic materials with large overpotential may include diamond-like carbon, conductive diamond (doped with boron, nitrogen or phosphorous), lead oxide, tin oxide, platinum, and the like.

Cathode catalytic materials are typically those that promote the evolution of hydrogen and may include, for instance, platinum, platinized carbon, carbon black, graphite, glassy carbon, and the like, as well as compounds or alloys containing, for instance, nickel, tungsten, molybdenum, and the like. A conductive diamond may also be used as a cathode material.

In the specific case where the anode comprises a conductive diamond, and the cell is used to electrolyze water, the anodic product typically may include high-oxidation potential oxidants such as ozone, hydrogen peroxide, hydroxyl radicals, oxygen radicals, and the like. Therefore, electrolytic generators including conductive diamond as anode catalytic material are practical devices for the generation of powerful a disinfectant to sanitize drinking water, surfaces, meat, fruit, vegetables, and the like.

Another aspect of the construction of a practical electrolytic generator that utilizes regular tap water is its ability to remove limescale deposits from the cathode. Polarity reversal is a convenient way to remove limescale from the cathode; however, most catalytic materials for electrolytic generators are not sufficiently stable to operate in a polarity-reversal operation for an extensive length of time and at high current densities.

Conductive diamond is particularly suited for the electrolytic generation of ozone because of its high overpotential for water electrolysis and its stability as a cathode material. An electrolytic-ozone generator with a conductive diamond as both the anode and the cathode materials can generate ozone at both electrodes while operating as anodes, removing the limescale under polarity reversal at full current density and a 50% duty cycle. In this way, ozone can be continuously produced. Because of this, a conductive diamond is a very suitable material for an electrolytic-ozone generator.

An electrolytic stack, defined by an anode, a cathode, and a polymer-electrolyte membrane placed between the anode and the cathode, represents a fundamental component of zero-gap electrolytic generators. Conventional electrolytic stacks are typically built in an electrolytic cell in such a matter that the polymer-electrolyte membrane provides physical separation of the water into two distinct chambers: the anodic chamber and the cathodic chamber. In typical applications, the water is split into two flows before entering the cell: the anodic flow and the cathodic flow. Because of the physical separation of these two flows, the anodic and cathodic products of the electrolytic reactions at the respective electrodes do not mix and exit the cell from the two outlets of the respective anolyte and catholyte flows.

Because of concern that hydrogen could react with ozone thus decreasing the ozone concentration, in some configurations the anodic and cathodic flows are strictly not allowed to mix until exiting the respective chambers. In other configurations, the cathodic flow is completely discarded or further processed before recombination with the water coming from the anodic chamber. In still other configurations, the cathodic and anodic flow are mixed, but only after exiting the cell from separate outlets. Still, a typical electrolytic cell has at least two inlets and two outlets.

The separation of the entering fluid into two distinct and separate flows may have some advantages in terms of quality or purity of the anodic and cathodic products; however, because of the separation of the anodic and cathode flows, scale-up production may require the serial addition of electrolytic generators. This could result in a significant increase in material cost since each cell must be identical and replicated in all its elements.

The replication of the cell material can be even more expensive when a free-standing, polycrystalline-conductive diamond is employed in electrolytic-ozone generators. Despite being small, these are expensive because the electrodes are made only of diamond material. As explained above, to scale up ozone production, several electrolytic generators added serially increases significantly the overall cost and complexity to ozone generation for a practical use.

Alternatively, the fabrication of a larger electrode is also expensive and complicated. The fabrication of large-surface-area, free-standing conductive diamond is not practical because of high cost and brittleness. For scaling up ozone production, the deposition of a conductive diamond on larger metal substrates (typically include niobium, tantalum, silicon, tungsten, titanium, and the like) might be more convenient than utilizing a free-standing diamond; however, when a conductive diamond is deposited on larger substrates, the thickness of the substrate must also increase to enhance the mechanical stability of a large electrode. The resulting electrode can be significantly heavy and challenging to handle in practical applications.

Because of the relatively high cost of fabricating electrodes comprising a conductive-diamond material (or any other expensive catalytic material), it would be beneficial to find practical ways to reduce costs while preserving the potential benefits of the electrolytic products. It would be further beneficial to provide a practical electrolytic generator that can reduce complexity and cost while still providing effective generation of electrolytic products.

SUMMARY OF THE INVENTION

This Summary of the Invention is provided to introduce a selection of concepts in a simplified form that are further described below in the Detailed Description section. This Summary of the Invention is not intended to identify key features or essential features of the claimed subject matter, nor is it intended to be used as an aid in determining the scope or spirit of the claimed subject matter.

An electrolytic generator in accordance with the principals of the present invention presents a practical way to reduce costs while preserving the potential benefits of the electrolytic products. An electrolytic generator in accordance with the principals of the present invention further provides a practical electrolytic generator that can reduce complexity and cost while still providing effective generation of electrolytic products.

In accordance with the principals of the present invention, an electrolytic generator is provided. A zero-gap electrolytic stack includes a first electrode, a second electrode, and a polymer-electrolyte membrane placed between the first and second electrodes. An electronic current is provided between the first electrode and the second electrode when a voltage bias is applied to the electrodes. The first electrode receives alternate polarities of electrical current while the second electrode receives opposite alternate polarities of electrical current, with the first electrode acting alternatively as an anode while the second electrode acts alternatively as a cathode. The first electrode acting as an anode defines an anolyte chamber producing an anolyte. The first electrode acting as a cathode defines a catholyte chamber producing a catholyte. The second electrode acting alternatively as a cathode defines a catholyte chamber producing a catholyte. The second electrode acting as an anode defines an anolyte chamber producing an anolyte, respectively. A first fluid passage provides fluid passage over the first electrode while a second fluid passage provides fluid passage over the second electrode. A third direct fluid passage provides fluid connection between the first fluid passage and the second fluid passage such that the fluid flows from the first fluid passage to the second fluid passage directly via the third fluid passage.

BRIEF DESCRIPTION OF THE DRAWINGS

The accompanying Drawings illustrate several embodiments and, together with the description, serve to explain the principles of the present invention according to the example embodiments. It will be appreciated by one skilled in the art that the particular arrangements illustrated in and described with respect to the Drawings are merely exemplary and are not to be considered as limiting of the scope or spirit of the present invention or the claims herein in any way.

As noted above, in the above reference Drawings, the present invention is illustrated by way of example, not limitation, and modifications may be made to the elements illustrated therein, as would be apparent to a person of ordinary skill in the art, without departing from the scope or spirit of the invention.

DETAILED DESCRIPTION OF EMBODIMENTS

Introduction

As previously described, because of the relatively high cost of fabricating of electrodes comprising a conductive-diamond material (or any other expensive catalytic material), there is a need to find practical ways to reduce costs while preserving the potential benefits of the electrolytic products. There is a further need to provide a practical electrolytic generator that can reduce complexity and cost while still providing an effective generation of electrolytic products.

An electrolytic generator in accordance with the principals of the present invention includes an electrolytic stack, comprised of a first electrode, a second electrode, and a polymer-electrolyte membrane placed between the first and second electrodes. Electrical connections are provided to the electrodes. A fluid inlet to the first electrode and a fluid outlet from the second electrode are provided. A fluid passage is provided over the first electrode (the first passage), and a fluid passage is provided over the second electrode (the second passage). An inner passage fluidly connects the first passage and the second passage. Fluid in the electrolytic generator is such that it flows through the first passage, through the inner passage, and then through the second passage.

In certain embodiments in accordance with the principals of the present invention, the first electrode and the second electrode can include suitable catalytic materials. The first and second electrodes may be made by the same electrolytic material. The first and second electrodes may include a conductive diamond.

In accordance with certain embodiments in accordance with the principals of the present invention, the first and second electrodes can be electrically connected to a power source so that the first electrode acts as an anode, and the second electrode acts as a cathode. Alternatively, the electrical connections to the power source can be such that the first electrode acts as a cathode and the second electrode acts as the anode. The power source can also alternate the polarity of the current applied to the electrodes. Therefore, the first electrode acts alternatively as an anode and a cathode, while the second electrode acts alternatively as a cathode and an anode, respectively.

When entering an inlet of the electrolytic generator, fluid flows through the first passage over the first electrode. Electrolytic products of the first electrode are transported with the fluid flow. Fluid and the electrolytic products of the first electrode then pass through the inner passage and enter the second passage over the second electrode. Electrolytic products of the second electrode are transported together with the fluid flow, including the electrolytic products of the first electrode. The electrolytic products of the first and second electrodes are transported together with the fluid flow through an outlet of the electrolytic generator.

Anodic and cathodic products can undergo wanted or unwanted, expected or unexpected reactions with each other; nonetheless, any chemical, physical, thermal or nuclear reaction between anodic and cathodic products does not limit the spirit or scope of the present invention. Some chemical reactions between anodic and cathodic products may have enhancing results for the final application. The anodic and cathodic products may be compatible and not react at all with each other. The anodic and cathodic products may not react appreciably with each other, and the benefits of the electrolytic products for the final application may not be affected. When no, or not an appreciable adverse, or enhancing reaction occurs between anodic and cathodic products, mixing of the flows, as illustrated in the present invention, might result in a significantly more efficient way to develop practical and economical electrolytic generators while maintaining the benefit of the electrolytic products.

In a preferred but non-limiting embodiment in accordance with the principals of the present invention, when the electrolytic generator includes an anode comprising a conductive diamond and the fluid is mostly water, a product of the electrolytic reaction at a conductive diamond anode in water is ozone. A product of the electrolytic reaction at the cathode is hydrogen gas. In contrast to the teachings of the prior art described above—where because of concerns that hydrogen could react with ozone thus decreasing the ozone concentration the cathodic flow is discarded, or further processed before recombination with the water coming from the anodic chamber, or mixed with the anodic flow only after the flows exit the cell from separate outlets—it has been surprisingly found that ozone and hydrogen do not react appreciably with each other, and that the ozone generated at the anode can flow with the water directly over the respective cathode without adverse consequences; therefore, ozone can be dispensed with the water flow from the outlet of the electrolytic generator and provide the disinfecting benefits illustrated above.

In another illustrative embodiment in accordance with the principals of the present invention, an electrolytic generator includes two electrolytic stacks. Each stack comprises a first electrode, a second electrode, and a polymer-electrolyte membrane placed between the first and the second electrodes. The electrolytic generator also comprises electrical connections to the electrolytic stacks, a water inlet, a water outlet, and a connecting water passage connecting the first electrolytic stack with the second electrolytic stack. When entering the electrolytic generator through the inlet, the water flows first in the first passage over the first electrode of the first stack, then through a first inner passage, then in the second passage over the second electrode of the first stack. The water then flows through a connecting passage, then in the first passage over the first electrode of the second stack, then through a second inner passage, then in the second passage over the second electrode of the second stack. The water then flows through the electrolytic-generator outlet. The inner and connecting passages can be internal to the components of the electrolytic-generator body.

In another illustrative embodiment in accordance with the principals of the present invention, an electrolytic generator includes a plurality of electrolytic stacks. Each stack comprises a first electrode, a second electrode, and a polymer-electrolyte membrane placed between the first and the second electrodes. The electrolytic generator also comprises electrical connections to the electrolytic stacks, a water inlet, a water outlet, and inner and connecting water passages fluidly and serially connecting the electrolytic stacks. When entering the electrolytic generator through the inlet, water flows first over the first electrode, through an inner passage, then over the second electrode. The water flows through the connecting passages from one stack to the next.

With a plurality of electrolytic stacks, the inner and connecting passages may be embedded in the components of the electrolytic-generator body/bodies. The inner and connecting passages may be external, not embedded in the electrolytic-generator body components, and can be comprised of tubing or piping or any other fluid connecting devices. Moreover, a skilled person in the art understands that multiple electrolytic generators may be connected via external connecting passages, where each electrolytic generator is comprised of one or multiple electrolytic stacks, inner passages, and internal connecting passages. In a preferred but non-limiting embodiment in accordance with the principals of the present invention, the electrolytic generator comprises inner passages and a connecting passage, where at least one passage is embedded in the electrolytic-generator cell body. This embodiment is preferred because it minimizes footprint and material costs while scaling up electrolytic output.

With certain embodiments in accordance with the principals of the present invention, the first and second electrodes of each of a plurality of stacks may be the same and may include a conductive diamond. In a preferred but non-limiting embodiment in accordance with the principals of the present invention, at least one electrode of the plurality of stacks includes a conductive diamond.

In accordance with certain embodiments in accordance with the principals of the present invention, each electrolytic stack may be connected to independent power sources. Each electrolytic stack can then act as an independent electrolytic generator, as described above. In a preferred but non-limiting embodiment in accordance with the principals of the present invention, at least two electrolytic stacks are powered by a power source, where the anodes of the electrolytic stacks are connected to the positive pole of the power source, and the cathodes of the electrolytic stacks are connected to the negative pole of the power source. The embodiment is preferred because it minimizes the complexity of the design and material costs.

It is contemplated that, in accordance with certain embodiments in accordance with the principals of the present invention, with a plurality of electrolytic stacks, for each electrolytic stack, each power source can also independently alternate the polarity of the current applied to the electrodes of the respectively connected electrolytic stack. In a preferred but non-limiting embodiment in accordance with the principals of the present invention, at least one electrolytic stack includes a first electrode comprising conductive diamond and a second electrode comprising conductive diamond. This configuration is particularly useful in the case of an electrolytic-ozone generator fed with regular tap water. Reversing the polarity applied to the electrodes at regular intervals can help remove limescale formation at the cathode. Because the conductive diamond electrodes can act as anode and cathode respectively, the ozone production does not cease while reversing the polarity of the electrodes for limescale removal.

Initial Considerations

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, electrical and other changes may be made without departing from the scope or spirit of the present invention. Particular features of one or more of the embodiments described herein may be described with reference to one or more particular embodiments or figures that form a part of the present invention, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the present invention in any way.

Components and parts that are connected to or in communication with each other need not be in continuous connection or communication with each other, unless expressly specified otherwise. In addition, components and parts that are connected to or in communication with each other may communicate directly or indirectly through one or more connection or communication means or intermediaries, logical or physical.

A description of an aspect with several components in connection or communication with each other does not imply that all such components are required. To the contrary, a variety of optional components may be described to illustrate a wide variety of possible embodiments and in order to more fully illustrate one or more embodiments. Similarly, although process steps, method steps or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single component or article is described herein, it will be readily apparent that more than one component or article may be used in place of a single component or article. Similarly, where more than one component or article is described herein, it will be readily apparent that a single device or article may be used in place of the more than one component or article.

The functionality or the features of a component may be alternatively embodied by one or more other components that are not explicitly described as having such functionality or features. Thus, other embodiments need not include the component itself.

Techniques and mechanisms described or referenced herein will sometimes be described in singular form for clarity; however, it should be appreciated that particular embodiments may include multiple iterations of a technique or multiple instantiations of a mechanism unless noted otherwise. Alternate implementations are included within the scope or spirit of various embodiments in which, for example, functions may be executed out of order from that shown or discussed, including substantially concurrently or in reverse order, depending on the functionality involved, as would be understood by those having ordinary skill in the art.

Conceptual Architecture

Figure 1:
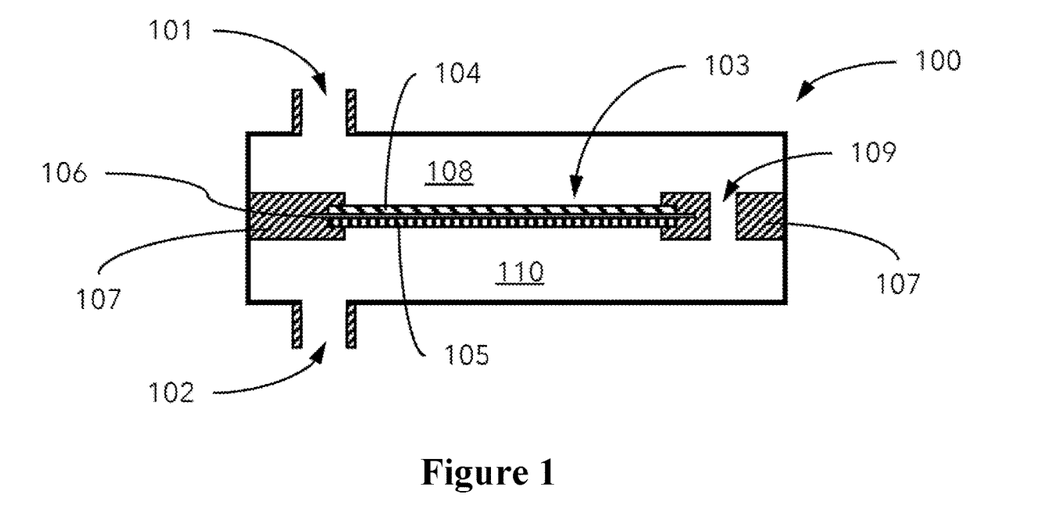
FIG. 1 is a schematic view of an example electrolytic generator in accordance with the principals of the present invention that includes an electrolytic stack comprising a first electrode, a second electrode, a polymer-electrolyte membrane placed between the first and the second electrode, an inlet, an outlet, and an inner passage.

In more detail and referring to FIG. 1, an example electrolytic generator 100 in accordance with the principals of the present invention is shown. Electrolytic generator 100 comprises an electrolytic stack 103 comprising a first electrode 104, a second electrode 105, and a polymer-electrolyte membrane 106 placed between the first and second electrodes 104 and 105. An internal support 107 can hold the electrolytic stack 103 in place. The internal support 107 and electrolytic stack 103 physically separate the cell in two chambers: a first fluid passage 108 and a second fluid passage 110. The first fluid passage 108 and the second fluid passage 110 are fluidly connected by a third or inner fluid passage 109. The electrolytic generator 100 has a fluid inlet 101 and a fluid outlet 102. During operations, the fluid enters the electrolytic generator 100 from inlet 101 and is caused to flow sequentially in the first fluid passage 108, then in the second fluid passage 110, passing through third fluid passage 109. The fluid then exits the electrolytic generator 100 from outlet 102.

The first electrode 104 and the second electrode 105 comprise catalytic materials suitable for the desired electrolytic reactions. The first electrode 104 and the second electrode 105 can comprise the same or different catalytic material depending on the chemical reaction sought. For the electrolytic generation of ozone, the electrolytic stack 103 can comprise at least one electrode including a conductive diamond and the fluid may be mostly water. As such, for ease of reference and without limiting the foregoing, in the description below the first fluid passage will be referred to as the first water passage 108, the second fluid passage will be referred to as the second water passage 110, and the third fluid passage will be referred to as the third water passage 109.

First and second electrodes 104 and 105 can be electrically connected to a power source so that first electrode 104 acts as an anode and second electrode 105 acts as a cathode, or vice versa. Thus, by definition when the first electrode 104 acts as an anode the portion of the electrolytic generator 100 in the immediate vicinity of the anode is defined as an anolyte and the first fluid passage 108 acts as an anolyte chamber while when the second electrode 105 acts as a cathode the portion of the electrolytic generator 100 in the immediate vicinity of the cathode is defined as a catholyte and the second fluid passage 110 acts as a catholyte chamber. (Because the electrical connections are known in the art, these are not shown in the Figures.) If first and second electrodes 104 and 105 are made of suitable catalytic material, the power source can also alternate the polarity of the current applied. As a result, first electrode 104 acts alternatively as an anode and a cathode, while second electrode 105 acts alternatively as cathode and anode, respectively. Again, by definition when the first electrode 104 acts as a cathode the portion of the electrolytic generator 100 in the immediate vicinity of the cathode is defined as a catholyte and the first fluid passage 108 acts as a catholyte chamber while when the second electrode 105 acts as an anode the portion of the electrolytic generator 100 in the immediate vicinity of the anode is defined as an anolyte and the second fluid passage 110 acts as an anolyte chamber. When using regular tap water, the electrolytic process can cause the deposition of limescale on the electrode when it acts as a cathode, but the reversal of the polarity removes the limescale from the electrode when it acts as an anode. The polarity reversal can be important when the fluid that enters the electrolytic generator is regular tap water, and the catalytic material is suitable to produce ozone and may include a conductive diamond.

Figure 2:
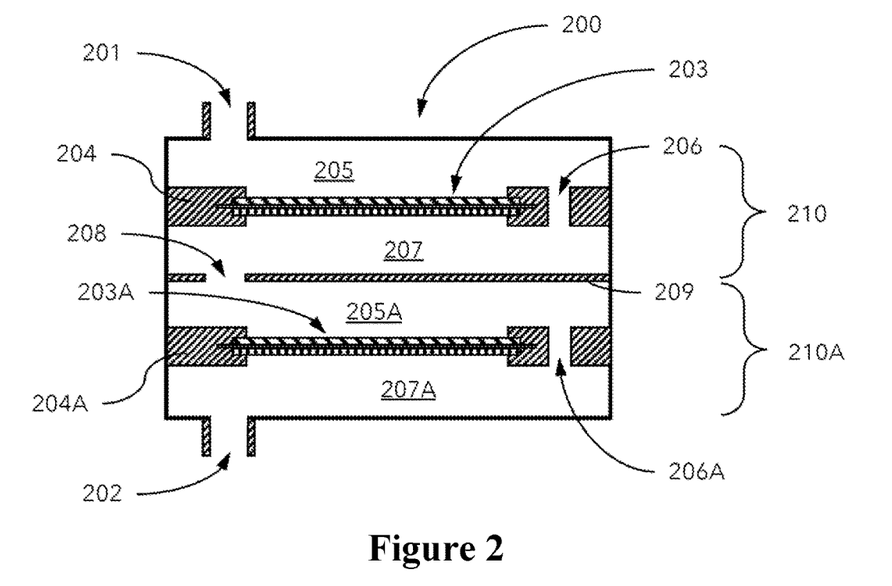
FIG. 2 is a schematic view of an example electrolytic generator in accordance with the principals of the present invention that includes two electrolytic stacks comprising each a first electrode, a second electrode, a polymer-electrolyte membrane placed between the first and the second electrode, an inlet, an outlet, two inner passages, and a connecting passage.

Referring to FIG. 2, an example electrolytic generator 200 in accordance with the principals of the present invention is shown. Electrolytic generator 200 includes electrolytic generators 210 and 210A. Electrolytic generators 210 and 210A comprise electrolytic stacks 203 and 203A, which can be constructed similarly to electrolytic stack 103. Electrolytic stacks 203 and 203A are comprised of a first electrode, a second electrode, and a polymer-electrolyte membrane placed between the first and second electrodes. The electrolytic generators 210 and 210A are fluidly connected in series via an internal divider 209 that includes connecting passages 208.

Fluidly connected in series means that internal supports 204 and 204A, electrolytic stacks 203 and 203A, and internal divider 209 physically define water passages 205, 207, 205A, and 207A such that the water is caused to flow in the first and then second water passages 205 and 207 of the electrolytic generator 210, then in the first and second water passages 205A and 207A of the electrolytic generator 210A via third passages 206, 208, and 206A. Water enters electrolytic generator 200 from inlet 201 and then exits from outlet 202.

Electrolytic generators 210 and 210A comprise electrodes made of catalytic materials suitable for the desired electrolytic reactions. Electrolytic stacks 203 and 203A may comprise electrodes including the same or different catalytic materials. Electrolytic stacks 203 and 203A may be identical.

The electrolytic generators 210 and 210A can be electrically connected to independent power sources. If the electrodes of the electrolytic stacks 203 and 203A are made of suitable material, the power sources may also alternate independently the polarity of the current applied. As a result, each electrolytic stack can undergo independent electrolytic processes. Electrolytic generators 210 and 210A may behave like two independent electrolytic generators 100 fluidly connected in series. For the generation of ozone, the electrolytic stacks 203 and 203A may comprise at least one electrode made of conductive diamond. It can be helpful that the electrolytic stacks 203 and 203A be identical so that they can produce more electrolytic products and reduce costs by being powered by the power source.

Figure 3:
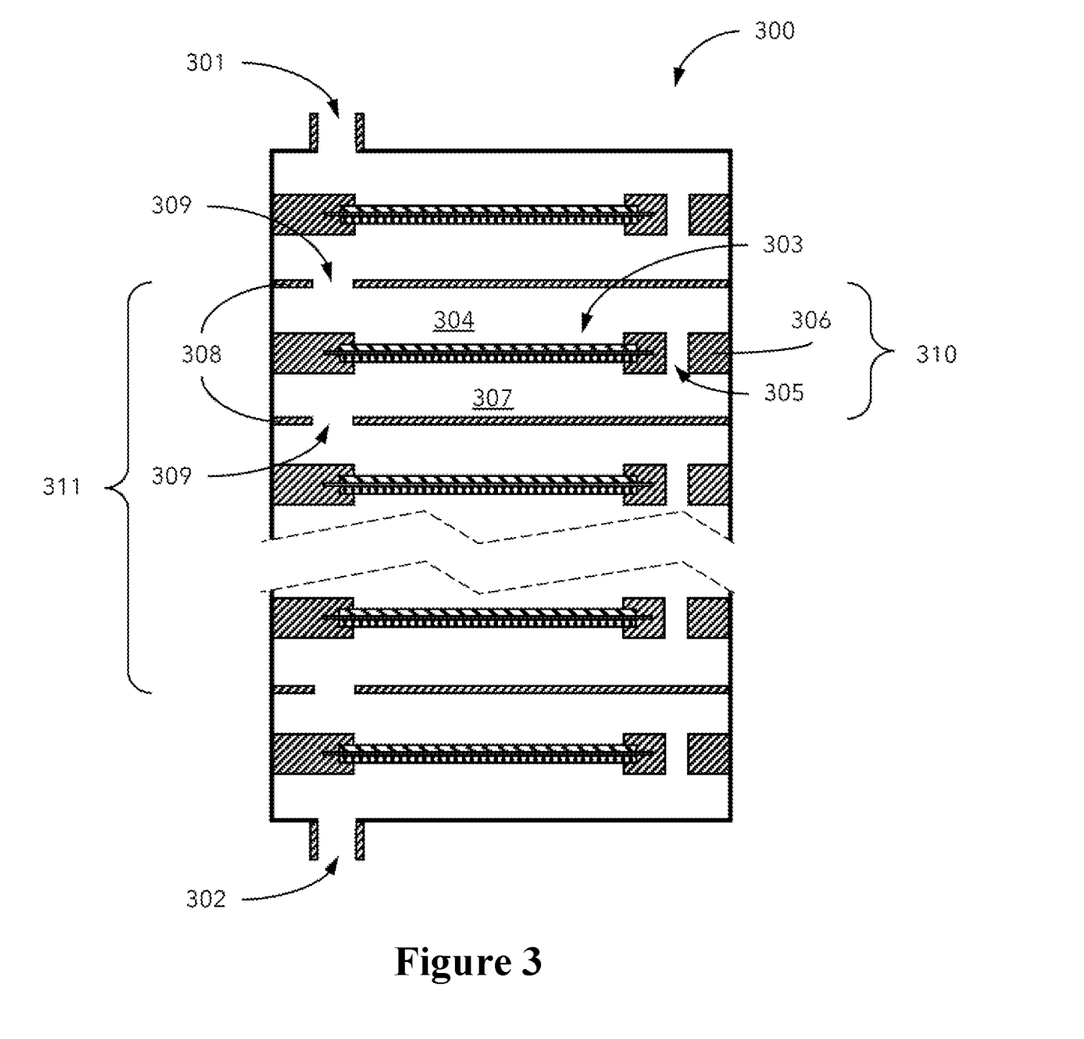
FIG. 3 is a schematic view of an example electrolytic generator in accordance with the principals of the present invention that includes a plurality of electrolytic stacks comprising inner passages and connected via connecting passages.

Referring to FIG. 3, an example electrolytic generator 300 in accordance with the principals of the present invention is shown. Electrolytic generator 300 includes a plurality 311 of electrolytic generators 310. Electrolytic generators 310 are made of electrolytic stacks 303, which can be constructed similarly to electrolytic stack 103, and each comprises a first electrode, a second electrode, and a polymer-electrolyte membrane placed between the first and second electrodes.

The electrolytic generators 310 are fluidly and serially connected via internal dividers 308 including connecting passages 309.

Serially connected means that internal supports 306, electrolytic stacks 303, and internal dividers 308 physically define water passages 304 and 307 such that the water is caused to flow in the first and then the second water passages 304 and 307 via third passages 305. Subsequently, the water flows from the second passage 304 of an electrolytic generator to the first water passage 307 of the next electrolytic generator via a connecting passage 309. Water enters electrolytic generator 300 from inlet 301 and then exits from outlet 302.

An electrolytic generator 310 comprises electrodes made of catalytic materials that are suitable for the desired electrolytic reactions. The electrolytic stack 303 of an electrolytic generator 310 may comprise electrodes including the same or different catalytic materials. Electrolytic generators 310 may be identical.

The electrolytic generators 310 can be electrically connected to independent power sources. If the electrodes of the electrolytic stacks 303 are made of suitable material, the power sources may also alternate independently the polarity of the current applied. As a result, each electrolytic stack 303 can undergo independent electrolytic processes. Each electrolytic generator 310 may behave like independent electrolytic generators 100 fluidly connected in series via inlets 101 and outlets 102. For the generation of ozone, the electrolytic stacks 303 may comprise at least one electrode including a conductive diamond. It can be helpful that the electrolytic stacks 303 be identical so that they can produce more electrolytic products and reduce costs by being powered by the power source.

Figure 4:
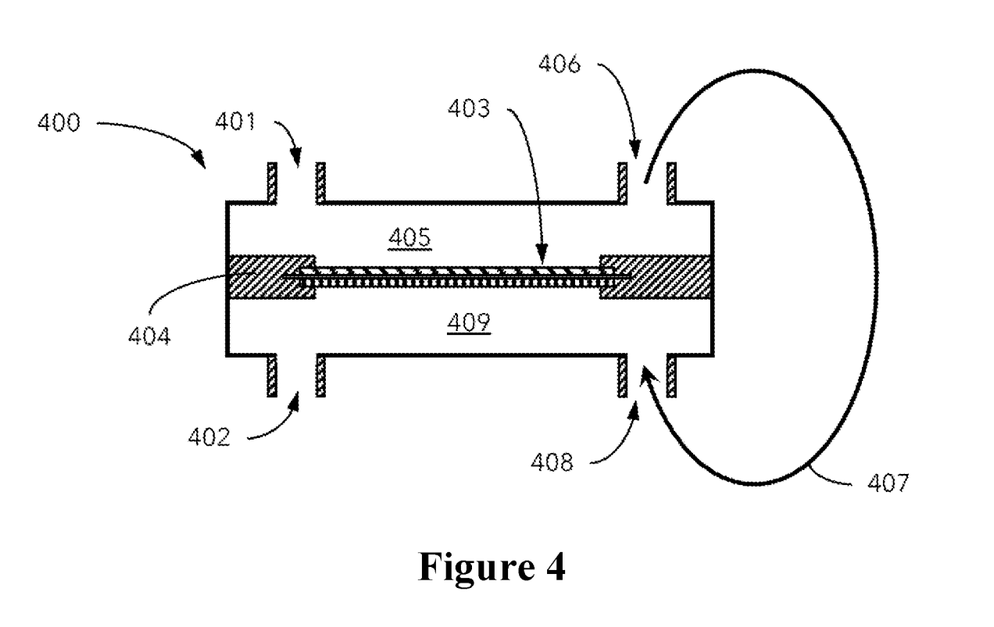
FIG. 4 is a schematic view of an example electrolytic generator in accordance with the principals of the present invention comprising a first passage and a second passage fluidly connected via an external passage.

Referring to FIG. 4, an example electrolytic generator 400 in accordance with the principals of the present invention is shown. Water enters electrolytic generator 400 from inlet 401 and then exits from outlet 402, while internal support 404 supports electrolytic stack 403. Electrolytic generator 400 can be similarly constructed to electrolytic generator 100, but without a third internal water passage 109; instead, in electrolytic generator 400 water passage 405 and 409 are in fluid connection via a third external water passage 407, from outlet 406 to inlet 408. Electrolytic stack 403 can be constructed similarly to electrolytic stack 103. The electrical connections, not shown, can also be the same as in 100.

Figure 5:
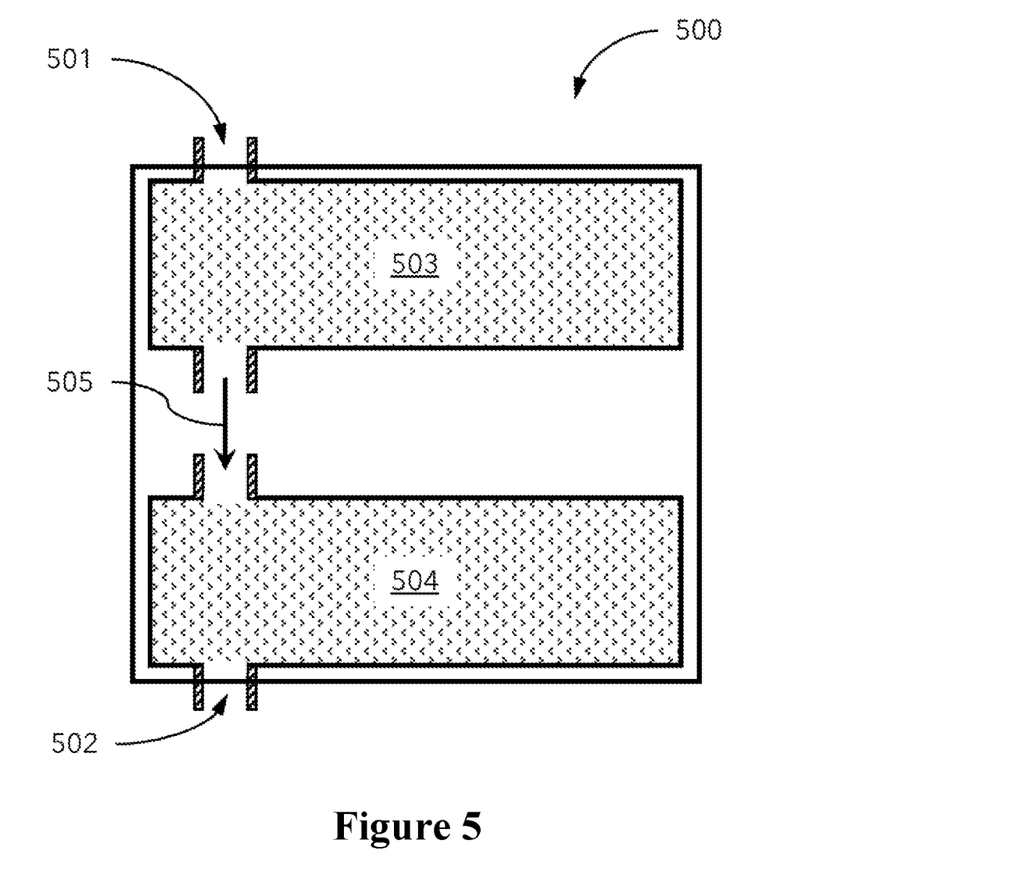
FIG. 5 is a schematic view of an example electrolytic generator in accordance with the principals of the present invention comprising two smaller electrolytic generators connected via an external passage.

Referring to FIG. 5, an example electrolytic generator 500 in accordance with the principals of the present invention is shown. Electrolytic generator 500 includes electrolytic generators 503 and 504. Electrolytic generators 503 and 504 may be electrolytic generators 100, 200, 300, or 400, or a combination thereof. Electrolytic generators 503 and 504 are fluidly connected via an external water passage 505. Water enters electrolytic generator 500 from inlet 501 and then exits from outlet 502.

Figure 6:
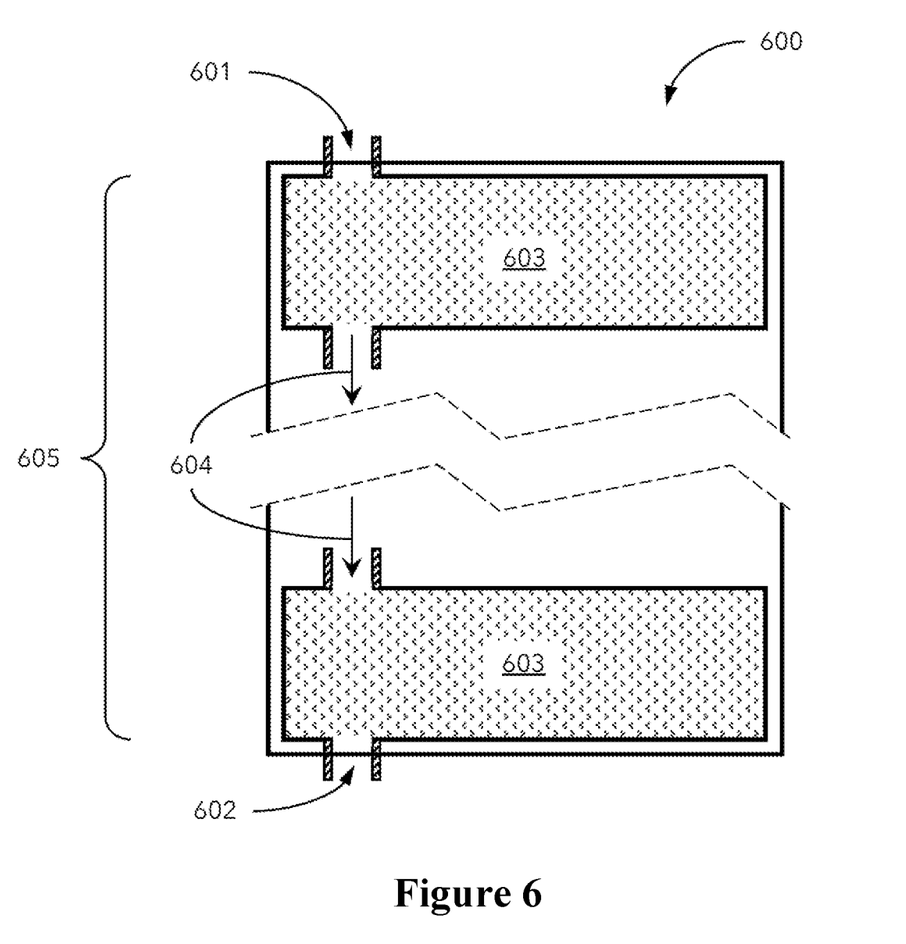
FIG. 6 is a schematic view of an example electrolytic generator in accordance with the principals of the present invention comprising a plurality of electrolytic generators connected via external passages.

Referring to FIG. 6, an example electrolytic generator 600 in accordance with the principals of the present invention is shown. Electrolytic generator 600 includes a plurality of electrolytic generators 603 fluidly and serially connected together 605. Electrolytic generators 603 may be electrolytic generators 100, 200, 300, 400, or 500 or a combination thereof. Electrolytic generators 603 are fluidly and serially connected via an external water passage 604. Water enters electrolytic generator 600 from inlet 601 and then exits from outlet 602.

Figure 7A:
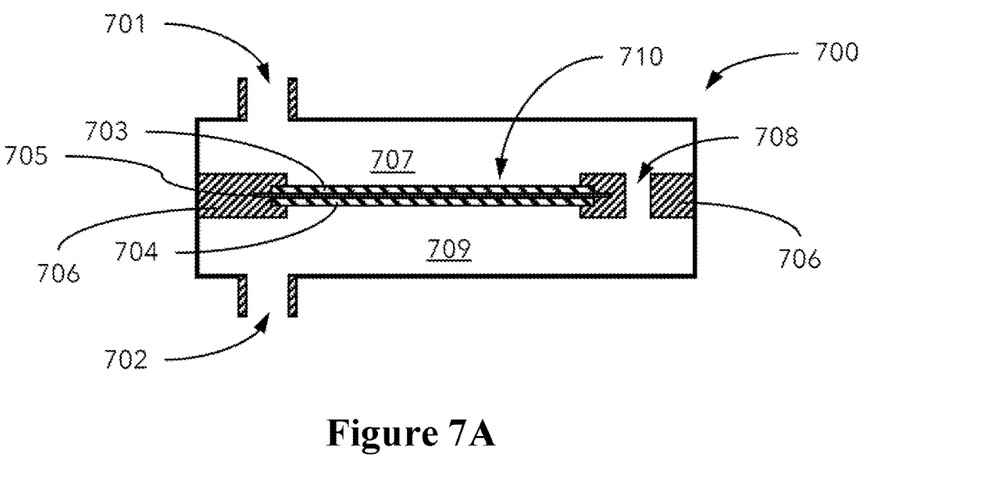
FIG. 7A is a schematic view of an example electrolytic generator in accordance with the principals of the present invention that includes an electrolytic stack comprising a first electrode, a second electrode, a polymer-electrolyte membrane placed between the first and the second electrode, an inlet, and an outlet, and an inner passage, wherein the electrodes include the same catalytic material.

Referring to FIG. 7A, an example electrolytic generator 700 in accordance with the principals of the present invention is shown. Electrolytic generator 700 includes an electrolytic stack 710 comprising a first electrode 703, a second electrode 704, and a polymer-electrolyte membrane 705 placed between electrodes 703 and 704. Internal support 706 holds the electrolytic stack 710 in place. The internal support 706 and electrolytic stack 710 physically separate the cell in two chambers: first water passage 707 and second water passage 709, fluidly connected via third passage 708. The electrolytic generator 700 has a fluid inlet 701 and a fluid outlet 702. During operations, the fluid, typically water, enters the electrolytic generator 700 from inlet 701 and is caused to flow sequentially in the first water passage 707, then in the second water passage 709, passing via third passage 708. The water then exits the electrolytic generator 700 from outlet 702.

The first electrode 703 and the second electrode 704 can be identical and comprise catalytic materials that are suitable for the desired electrolytic reactions. For the electrolytic generation of ozone, the electrolytic stack 710 comprises two electrodes including a conductive diamond.

Electrodes 703 and 704 can be electrically connected to a power source in such a way that electrode 703 acts as an anode and electrode 704 acts as a cathode, or vice versa. Thus, by definition when the electrode 703 acts as an anode the portion of the electrolytic generator 700 in the immediate vicinity of the anode is defined as an anolyte and the first fluid passage acts as an anolyte chamber while when the electrode 704 acts as a cathode the portion of the electrolytic generator 700 in the immediate vicinity of the cathode is defined as a catholyte and the second fluid passage acts as a catholyte chamber. When electrodes 703 and 704 are identical and include a conductive diamond, the power source can also alternate the polarity of the current applied. As a result, electrode 703 acts alternatively as an anode and a cathode while electrode 704 acts alternatively as cathode and anode, respectively. Again, by definition when the electrode 703 acts as a cathode the portion of the electrolytic generator 700 in the immediate vicinity of the cathode is defined as a catholyte and the first fluid passage acts as a catholyte chamber while when the electrode 704 acts as an anode the portion of the electrolytic generator 700 in the immediate vicinity of the anode is defined as an anolyte and the second fluid passage acts as an anolyte chamber. When using regular tap water, the electrolytic process can cause the deposition of limescale on the electrode when it acts as a cathode, but the reversal of the polarity removes the limescale from the electrode when it acts as an anode. The polarity reversal is important when the fluid that enters the electrolytic generator is regular tap water, and the catalytic material is also suitable to produce ozone.

Figure 7B:
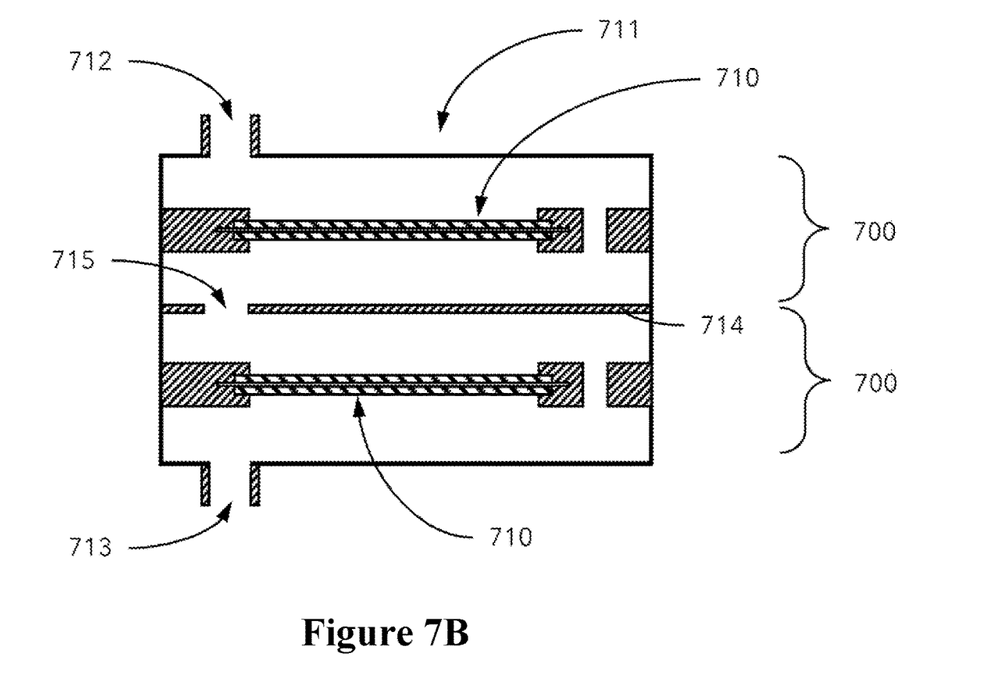
FIG. 7B is a schematic view of an example electrolytic generator in accordance with the principals of the present invention that includes two electrolytic stacks, wherein the electrodes of the electrolytic stacks comprise electrodes including the same catalytic material.

Referring to FIG. 7B, an example electrolytic generator 711 in accordance with the principals of the present invention is shown. Water enters electrolytic generator 711 from inlet 712 and then exits from outlet 713, Electrolytic generator 711 can include two identical electrolytic generators 700 fluidly connected in series via water passage 715 defined within the internal divider 714.

Figure 8A:
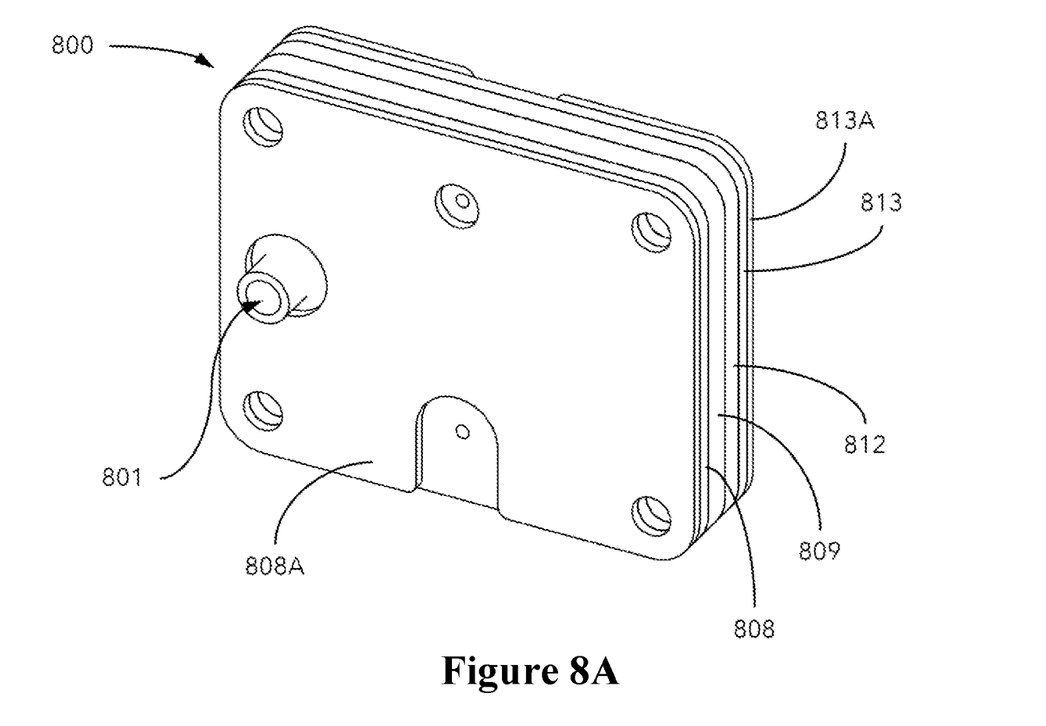
FIG. 8A is the perspective view of an exterior of an example electrolytic cell in accordance with the principals of the present invention that includes an electrolytic generator.
Figure 8B:
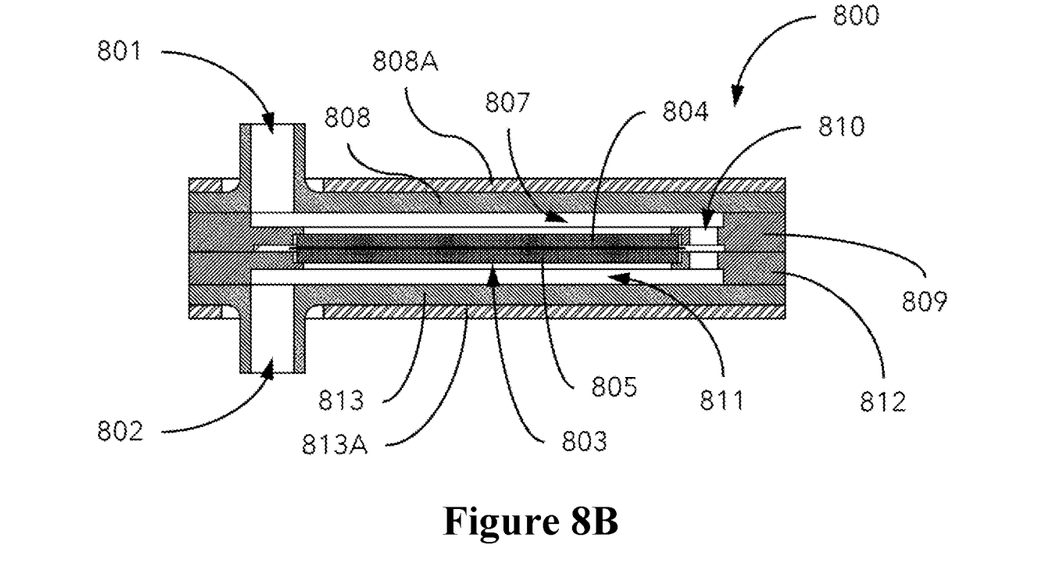
FIG. 8B is the cross-sectional view of the electrolytic cell of FIG. 8A, showing the electrolytic generator of FIG. 8A.

Referring to FIG. 8A and FIG. 8B, an example embodiment of a practical application of the electrolytic generator 700 in accordance with the principals of the present invention in the form of an electrolytic cell 800 is shown. The electrolytic cell 800 comprises two end plates 808A and 813A juxtaposed to channel lids 808 and 813. Channel lid 808 includes the inlet 801, and channel lid 813 includes the outlet 802. The channel lids 808 and 813 are in contact with the channel bodies 809 and 812. Channel bodies 809 and 812 also function as support for the electrolytic stack 803. Channel bodies 809 and 812 have openings that form a third water passage of 810. The volume comprised between channel lids 808 and 813, channel bodies 809 and 812, and electrolytic stack 803 define respectively the first water passages 807 and the second water passage 811 that cause the water to flow in the first water passage 807 and then in the second water passage 811 via water passage 810.

As described for electrolytic generator 700, the first electrode 804 and the second electrode 805 can be identical and comprise catalytic materials that are suitable for the desired electrolytic reactions. For the electrolytic generation of ozone, the electrolytic stack 803 comprises two electrodes including a conductive diamond.

Electrodes 804 and 805 can be electrically connected to a power source in such a way that electrode 804 acts as an anode and electrode 805 acts as a cathode, or vice versa. Thus, by definition when the electrode 804 acts as an anode the portion of the electrolytic generator 800 in the immediate vicinity of the anode is defined as an anolyte and the first water passages 807 acts as an anolyte chamber while when the electrode 805 acts as a cathode the portion of the electrolytic generator 800 in the immediate vicinity of the cathode is defined as a catholyte and the second water passage 811 acts as a catholyte chamber. The power source can also alternate the polarity of the current applied. As a result, electrode 804 can act alternatively as an anode and a cathode while electrode 805 can act alternatively as cathode and anode, respectively. Again, by definition when the electrode 804 acts as a cathode the portion of the electrolytic generator 800 in the immediate vicinity of the cathode is defined as a catholyte and the first water passage 807 acts as a catholyte chamber while when the electrode 805 acts as an anode the portion of the electrolytic generator 800 in the immediate vicinity of the anode is defined as an anolyte and the second water passage 811 acts as an anolyte chamber. For the electrolytic generation of ozone using regular tap water, electrodes 804 and 805 include a conductive diamond, and the electrolytic process can cause the deposition of limescale on the cathode. Since a conductive diamond is a suitable catalytic material used as anode and cathode, the reversal of the polarity removes the limescale from the electrode when it acts as an anode without interruption of ozone generation.

Figure 9A:
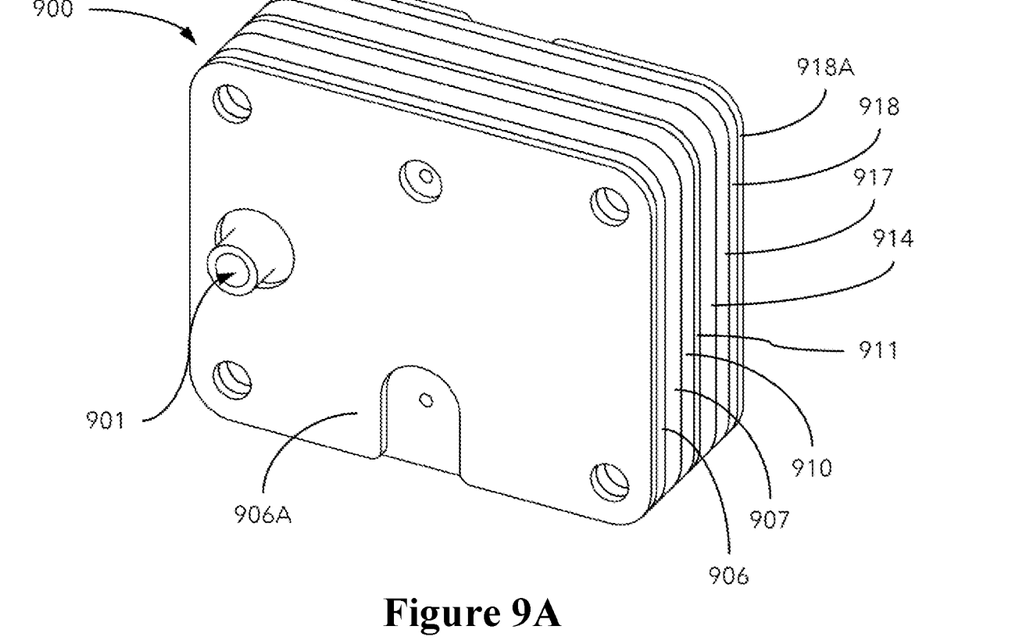
FIG. 9A is the perspective view of an exterior of an example electrolytic cell in accordance with the principals of the present invention that includes two electrolytic generators.
Figure 9B:
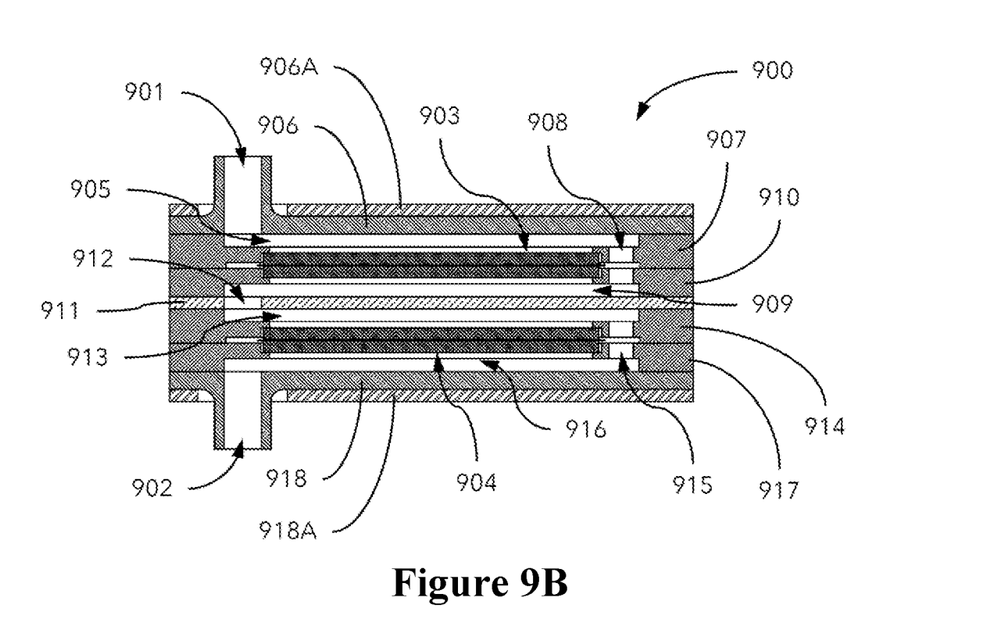
FIG. 9B is a cross-sectional view of the electrolytic cell of FIG. 9A, showing the electrolytic generators of FIG. 9A.

Referring to FIG. 9A and FIG. 9B, an example embodiment of a practical application of the electrolytic generator 711 in accordance with the principals of the present invention in the form of an electrolytic cell 900 is shown. The electrolytic cell 900 comprises two end plates 906A and 918A juxtaposed to channel lids 906 and 918. Channel lid 906 includes the inlet 901, and channel lid 918 includes the outlet 902. The channel lids 906 and 918 are in contact with the channel bodies 907 and 917, respectively. Internal divider 911 is in contact with the channel bodies 910 and 914. A water passage 912 is defined within the internal divider 911. Channel bodies 907 and 910 also function as support for the electrolytic stack 903 and channel bodies 914 and 917 also function as support for electrolytic stack 904. The volume comprised between channel lids 906 and 918, channel bodies 907 and 917, and electrolytic stacks 903 and 904 defines the first water passage 905 and the second water passage 916, respectively. The volume comprised between the internal divider 911, channel bodies 910 and 914, and electrolytic stacks 903 and 904 define the first water passage 909 and the second water passage 913, respectively. Channel bodies 907 and 910 have openings that together form an internal water passage 908 that fluidly connects water passage 905 to water passage 909. Channel bodies 914 and 917 have openings that together form an internal water passage 915 that fluidly connects water passage 913 to water passage 916. Water passages cause the water to flow in contact with the first water passage and the second water passage of each electrolytic stack, respectively.

As described for electrolytic generator 711, the electrolytic stacks 903 and 904 can comprise identical electrodes including catalytic materials suitable for the desired electrolytic reactions. For the electrolytic generation of ozone, the electrolytic stack 903 and 904 comprises electrodes including a conductive diamond.

Electrolytic stacks 903 and 904 can be electrically connected to a power source as described for electrolytic generator 711. The power source can also alternate the polarity of the current applied. The electrodes of the electrolytic stacks 903 and 904 comprise electrodes including a conductive diamond. For the electrolytic generation of ozone using regular tap water the electrolytic process can cause the deposition of limescale on the cathode. Since conductive diamond is a suitable catalytic material that can be used as anode and cathode, the reversal of the polarity removes the limescale from the electrodes when the electrodes act as anodes without interrupting ozone generation.

While a system and apparatus in accordance with the principals of the present invention has been described with specific embodiments, other alternatives, modifications, and variations will be apparent to those skilled in the art. Accordingly, it will be intended to include all such alternatives, modifications and variations set forth within the spirit and scope of the appended claims.

What is claimed is:

1. An electrolytic generator comprising:
a zero-gap electrolytic stack comprised of a first electrode, a second electrode, and a polymer-electrolyte membrane placed between the first and second electrodes, the electrodes adapted to receive electrical current between the first electrode and the second electrode when a voltage bias is applied to the electrodes;
the first electrode is configured to receive alternate polarities of electrical current while the second electrode is configured to receive opposite alternate polarities of electrical current, with the first electrode acting alternatively as an anode thereby defining an anolyte chamber producing an anolyte and a cathode thereby defining a catholyte chamber producing a catholyte while the second electrode acts alternatively as a cathode thereby defining a catholyte chamber producing a catholyte and an anode thereby defining an anolyte chamber producing an anolyte, respectively;
a fluid passage comprising a first fluid passage, a second fluid passage, and a third, direct fluid passage, the first fluid passage causing a fluid to be in contact with the first electrode of the zero-gap electrolytic stack, the second fluid passage causing the fluid to be in contact with the second electrode of the zero-gap electrolytic, and the third, direct passage providing direct fluid connection between the first fluid passage and the second fluid passage, wherein the fluid flows from the first fluid passage to the second fluid passage via the third, direct fluid passage such that when the first fluid passage is an anolyte chamber, the anolyte enters the second fluid passage, which is a catholyte chamber, via the third, direct fluid passage and when the first fluid passage is a catholyte chamber, the catholyte enters the second fluid passage, which is an anolyte chamber, via the third, direct fluid passage.

2. The electrolytic generator of claim 1, wherein the electrolytic generator has an inlet in fluid connection with the first fluid passage and an outlet in fluid connection with the second fluid passage.

3. The electrolytic generator of claim 2, wherein the outlet of the electrolytic generator is in fluid connection with an inlet of another electrolytic generator via a connecting passage.

4. The electrolytic generator of claim 3, wherein the connecting passage is internal.

5. The electrolytic generator of claim 3, wherein the connecting passage is external.

6. The electrolytic generator of claim 5, wherein the connecting passage is selected from the group consisting of a tube, a pipe, and combinations thereof.

7. The electrolytic generator of claim 1 wherein the electrolytic generator comprises a first electrolytic generator, and a second electrolytic generator is further provided wherein the second fluid passage of the first electrolytic generator is in fluid connection with a first fluid passage of the second electrolytic generator via a connecting passage.

8. The electrolytic generator of claim 7 further comprising a third electrolytic generator, wherein a second fluid passage of the second electrolytic generator is in fluid connection with a first fluid passage of the third electrolytic generator via a connecting passage.

9. The electrolytic generator of claim 1, wherein at least one electrode of the first electrode and the second electrode of the zero-gap electrolytic stack is made of conductive diamond, wherein the conductive diamond is selected from the group consisting of boron-doped diamond, nitrogen-doped diamond, phosphorous-doped diamond, and combinations thereof.

10. The electrolytic generator of claim 1, wherein at least one electrode of the first electrode and the second electrode of the zero-gap electrolytic stack comprises a free-standing, conductive-diamond electrode, wherein the free-standing, conductive-diamond electrode is selected from the group consisting of boron-doped diamond electrode, nitrogen-doped diamond electrode, phosphorous-doped diamond electrode, and combinations thereof.

11. The electrolytic generator of claim 1, wherein the electrodes are made of a conductive substrate coated with a conductive diamond, further wherein the conductive substrate is selected from the group consisting of silicon, niobium, tungsten, tantalum, titanium, their respective alloys, and combinations thereof.

12. The electrolytic generator of claim 1, wherein the polymer-electrolyte membrane comprises a proton-exchange membrane.

13. The electrolytic generator of claim 1, wherein the first electrode receives electrical current such as to act as an anode and the second electrode receives electrical current such as to act as a cathode.

14. The electrolytic generator of claim 1, wherein the first electrode receives electrical current such as to act as a cathode and the second electrode receives electrical current such as to act as an anode.

15. The electrolytic generator of claim 1, wherein the fluid comprises water.

16. The electrolytic generator of claim 15, wherein at least one electrode of the first electrode and the second electrode comprises a conductive diamond, and products of the electrolytic reaction at the anode in water include ozone, and products of the electrolytic reaction at the cathode in water include hydrogen gas.

17. The electrolytic generator of claim 1, wherein the first fluid passage and the second fluid passage are internal.

18. The electrolytic generator of claim 17, wherein the first fluid passage and the second fluid passage are formed within the components of the electrolytic generator.

19. The electrolytic generator of claim 1, wherein the first fluid passage and the second fluid passage are external.

20. The electrolytic generator of claim 1, wherein reversing the polarity of the electrodes removes limescale from the electrodes while ozone production does not cease.

21. An electrolytic generator comprising:
a zero-gap electrolytic stack comprising a polymer electrolyte membrane between first and second electrodes configured for polarity reversal;
the electrolytic generator comprising a first fluid passage in contact with the first electrode alternatively as an anolyte/catholyte chamber, a second passage in contact with the second electrode alternatively as the opposite anolyte/cathode chamber, and a third direct fluid passage such that a fluid flows between the first fluid passage and the second fluid passage directly through the third fluid passage.

* * * * *